(12) United States Patent
Haneda et al.

(10) Patent No.: US 6,490,366 B1
(45) Date of Patent: Dec. 3, 2002

(54) INFORMATION PROCESSING APPARATUS

(75) Inventors: Isamu Haneda, Kyoto (JP); Toshio Isoe, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/216,542

(22) Filed: Dec. 18, 1998

(30) Foreign Application Priority Data

Dec. 24, 1997 (JP) .............................................. 9-354714

(51) Int. Cl.⁷ .............................. G06K 9/00; G06K 9/68
(52) U.S. Cl. ....................................... 382/126; 382/218
(58) Field of Search ................................ 382/115, 116, 382/124, 125, 126, 209, 217, 218

(56) References Cited

U.S. PATENT DOCUMENTS

| | | | | | |
|---|---|---|---|---|---|
| 4,394,773 A | * | 7/1983 | Ruell | .......................... | 382/124 |
| 5,088,817 A | * | 2/1992 | Igaki et al. | .................... | 356/71 |
| 5,635,723 A | * | 6/1997 | Fujieda et al. | ............... | 250/556 |
| 5,736,734 A | * | 4/1998 | Marcus et al. | ............... | 250/225 |
| 5,974,162 A | * | 10/1999 | Metz et al. | .................. | 382/124 |
| 6,088,585 A | * | 7/2000 | Schmitt et al. | ............. | 340/5.83 |

FOREIGN PATENT DOCUMENTS

| | | | | |
|---|---|---|---|---|
| JP | U 1-120270 | 8/1989 | | |
| JP | U 4-4352 | 1/1992 | | |
| JP | A 4-352547 | 12/1992 | | |
| JP | 09-034635 | * 2/1997 | ............. | G06F/3/33 |

* cited by examiner

Primary Examiner—Joseph Mancuso
Assistant Examiner—Mehrdad Dastouri
(74) Attorney, Agent, or Firm—Dike, Bronstein, Roberts & Cushman; David G. Conlin; John Joseph Penny, V

(57) ABSTRACT

When a user places his finger on a fingerprint detecting section, in the fingerprint detecting section, a shadow made by the finger placed on the fingerprint detecting section is detected by a sensor portion, and then, when it is judged that a shape of the detected shadow coincides with a distribution of the shadow made by the user's finger, and thereby, a power is turned on. Thereafter, a fingerprint is detected from the finger placed on the fingerprint detecting section, and then, the detected fingerprint is collated with a previously stored fingerprint data so as to identify the user. Further, it is possible to use various data such as schedule data corresponding to the identified user. Therefore, this dispenses an operation for turning on the power and an instruction for starting fingerprint collation.

1 Claim, 12 Drawing Sheets

INFORMATION PROCESSING APPARATUS

BACKGROUND OF THE INVENTION

1. Field of the Invention

The present invention relates to an information processing apparatus which identifies a user with the use of a person verifying function by a fingerprint when using a portable telephone and a portable information terminal equipment.

2. Description of the Related Art

According to the related art, when using a portable telephone, portable information terminal equipment or the like, personal verification (identification) has been made with the use of a fingerprint of the person so that other persons can not have access to the person's information.

For example, Japanese Unexamined Utility Model Publication JP-U 1-120270 has disclosed a technique of collating a user's fingerprint with a previously registered fingerprint, and controlling turn on/off of a power source of data terminal equipment in accordance with a collation result.

Further, Japanese Unexamined Utility Model Publication JP-U 4-4352 has disclosed a technique of providing a cover which is located on a finger touch surface for being touched by a fingertip so as to freely reciprocate to open and close, and a sensor for detecting a cover open state, and supplying a power to a fingerprint input section when the cover open state is detected by the sensor.

Further, Japanese Unexamined Patent Publication JP-A 4-352547 has disclosed a technique of reading a user's fingerprint, collating a fingerprint data registered in a portable telephone with the read user's fingerprint information, and further, setting and displaying the corresponding user's personal telephone number from personal telephone numbers registered in the portable telephone in the case where the coincidence of collation is obtained, and thus, making a call.

However, according to the aforesaid related art, in order to collate the fingerprint, there is a need of carrying out a power-on operation and providing a fingerprint collating start instruction. Accordingly a problem arises such that the operation is troublesome.

Further, in using the apparatus, an operation for recognizing the user's fingerprint is always continued to identify the user. Accordingly, a problem arises such that a power and a load on the apparatus are always applied in order to recognize the user's fingerprint, and an identifiction process is interrupted when the user's fingerprint can not be recognized due to a movement of the finger placed on a plate.

SUMMARY OF THE INVENTION

An object of the present invention is to provide an information processing apparatus which can be easily operated.

Further, another object of the invention is to provided an information processing apparatus which can recognize a fingerprint even if a finger is moved on a plate.

The invention relates to an information processing apparatus comprising:

a finger contact plate for making a finger contact;

a light source for irradiating light to a contacting finger via the finger contact plate;

a fingerprint detecting section for detecting a fingerprint on the basis of reflected light of the light source; and a fingerprint collating section for collating the fingerprint detected by the fingerprint detecting section with a previously stored fingerprint, the information processing apparatus further comprising:

a contact detecting section for detecting a contact of the finger onto the finger contact plate; and a light source driving section for driving the light source when a contact of the finger is detected by the contact detecting section.

According to the invention, it is possible to dispense a key operation for starting fingerprint collation, so that the number of troublesome operations can be reduced.

Further, in the invention it is preferable that the information processing apparatus further comprises a light source stopper section for stopping the light source from being driven by the light source driving section when fingerprint collation by the fingerprint collating section is completed.

According to the invention, it is possible to prevent power consumed by wasteful drive of the light source.

The invention relates to an information processing apparatus comprising:

a finger contact plate for making a finger contact;

a light source for irradiating light to a contacting finger via the finger contact plate;

a fingerprint detecting section for detecting a fingerprint on the basis of reflected light of the light source; and a fingerprint collating section for collating the fingerprint detected by the fingerprint detecting section with a previously stored fingerprint, the information processing apparatus further comprising:

a contact detecting section for detecting a contact of the finger onto the finger contact plate;

a light source driving section for driving the light source when a contact of the finger is detected by the contact detecting section; and a control section for putting the apparatus in a usable state when a coincident collation result is obtained by the fingerprint collating section.

According to the invention, it is possible to dispense a key operation for starting fingerprint collation, so that the number of troublesome operations can be reduced.

Further, in the invention it is preferable that the information processing apparatus further comprises a light source stopper section for stopping the light source from being driven by the light source driving section when fingerprint collation by the fingerprint collating section is completed.

According to the invention, it is possible to prevent power consumed by wasteful drive of the light source.

Further, in the invention it is preferable that the control section continuously puts the apparatus in a usable state when the contact of the finger onto the finger contact plate is continuously detected.

According to the invention, it is unnecessary to continue the fingerprint collation. Therefore it is possible to prevent power consumed by the wasteful driving of the light source. Further, the user is the same so long as the finger continuously contacts with the finger contact plate, and accordingly it is possible to restrict the user.

Further, in the invention it is preferable that the control section continuously puts the apparatus into a usable state when a movement of the finger in contact with the finger contact plate is detected by the contact detecting section.

According to the invention, the usable state of the apparatus is kept without continuing the fingerprint collation and the contact of the finger onto the finger contact plate Therefore, it is possible to reduce the user's load that the user's finger has to be placed on the finger contact plate maintaining the contact therewith.

Further, in the invention it is preferable that the contact detecting section is constructed in such a manner that a plurality of light receiving elements for generating a voltage by irradiation with light, are arranged in the form of a plane.

According to the invention, it is possible to detect the finger contact by the contact detecting section having a simple structure.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
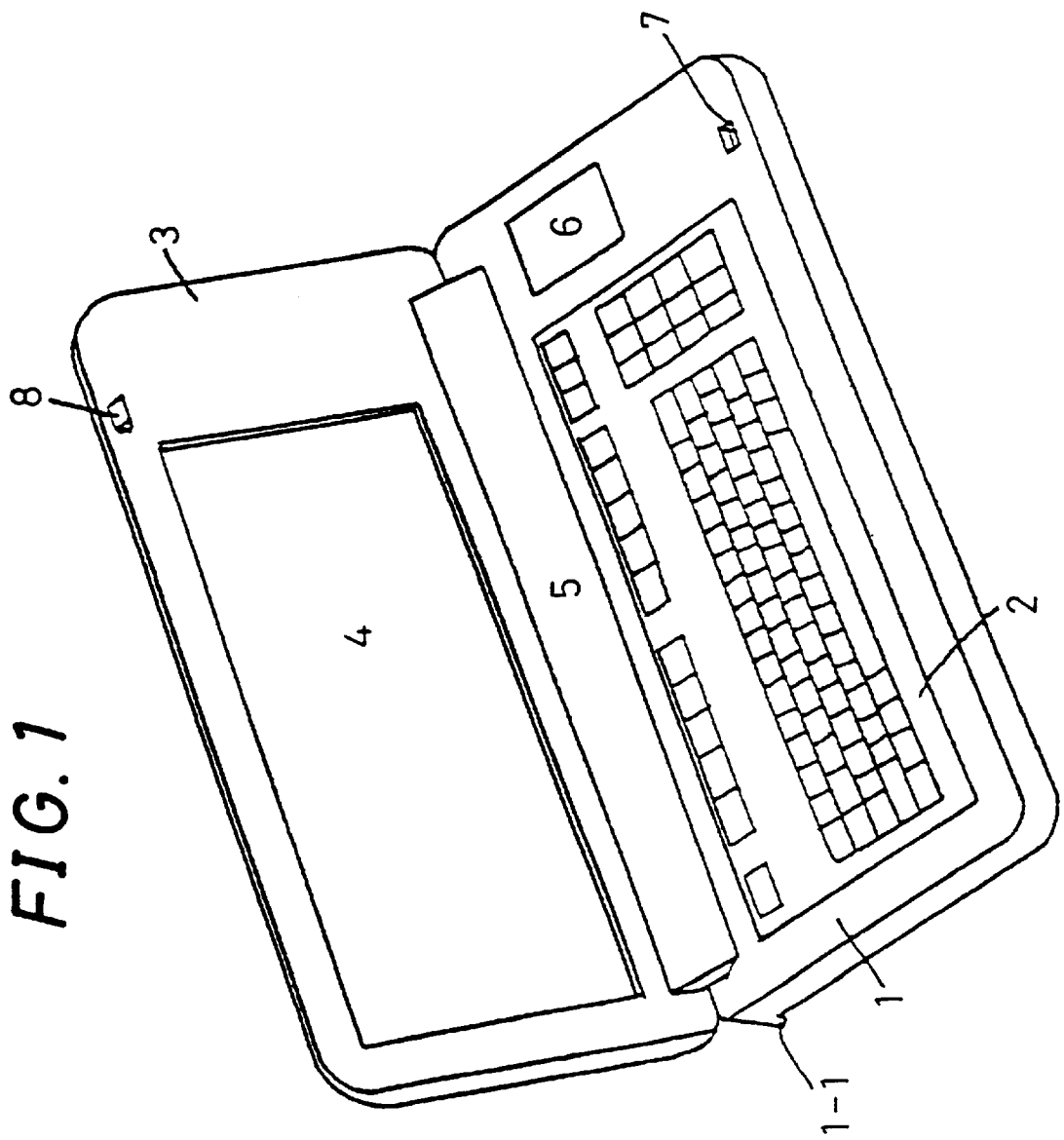
FIG. 1 is an external perspective view showing a portable information terminal equipment according to the present invention.

Now referring to the drawings, preferred embodiments of the invention are described below.

FIG. 1 is an external perspective view showing a portable information terminal equipment according to the invention.

In FIG. 1, the portable information terminal equipment, to which the invention is applied, comprises a main-body cabinet 1 and a cover 3. The main-body cabinet 1 and a cover 3 are connected to each other by a hinge portion 5. The cover 3 is rotatably mounted to the main-body cabinet 1 by the hinge portion 5.

When the cover is closed, a stopper protrusion 8 of the cover 3 is engaged in a stopper portion 7 of the main-body cabinet 1, and thereby, the cover 3 is fixed onto the cabinet 1 in a state of being closed.

The main-body cabinet 1 is provided with an input section 2 for inputting characters or the like, and a fingerprint detecting section 6 for identifying a user when the user places his finger on the fingerprint detecting section. Incidentally, a structure of the fingerprint detecting section 6 will be detailedly described later.

A function of each function key of the input section 2 is displayed on the surface of the hinge portion 5.

In the case of using the equipment in a state of being placed on a desk or the like, the main-body cabinet 1 has a leg 1-1 for tilting the cabinet 1 so that the equipment can be easily handled.

The cover 3 includes a display section 4 for displaying information inputted from the input section 2, or the like.

Figure 2:
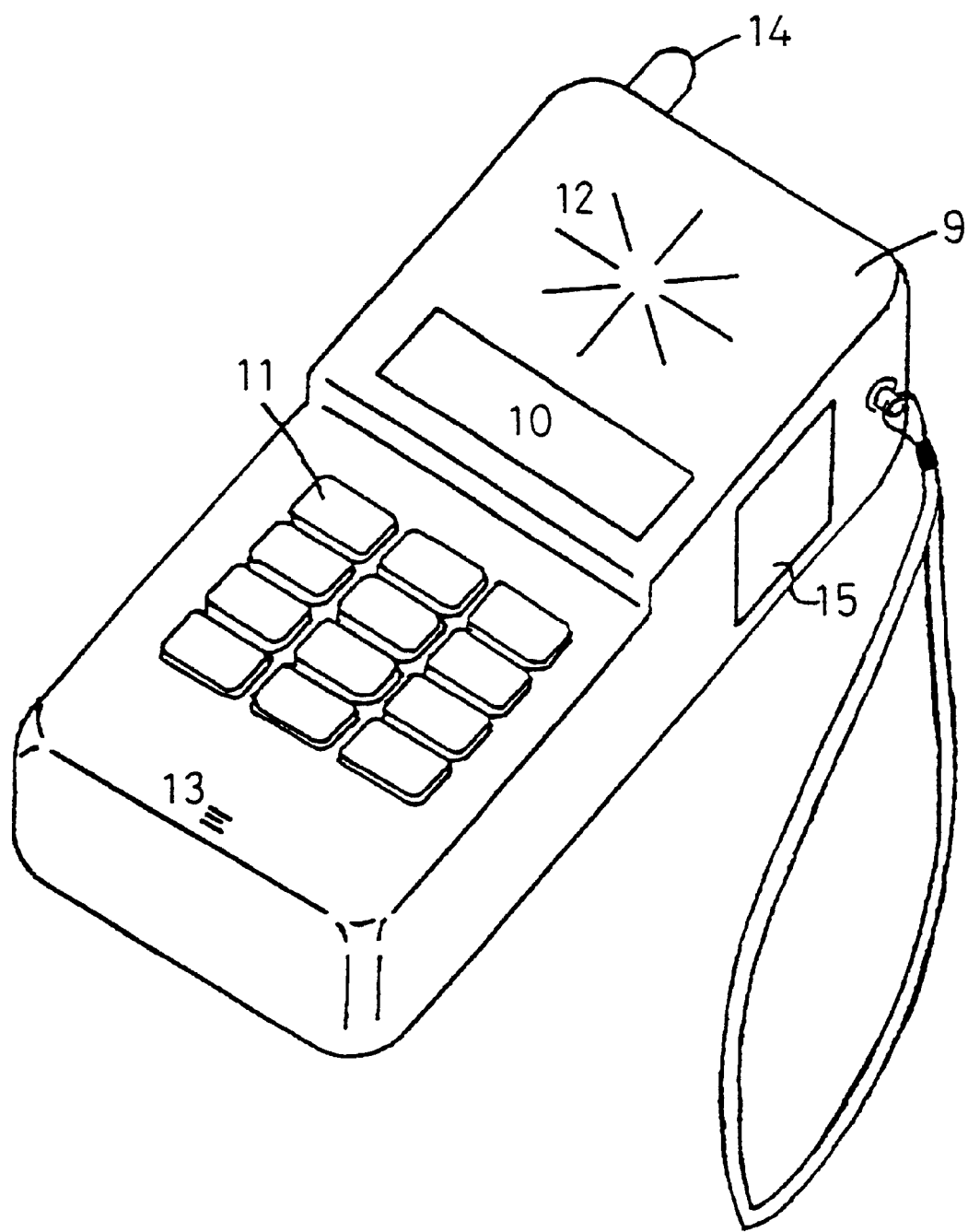
FIG. 2 is an external perspective view showing a portable telephone according to the invention.

FIG. 2 is an external perspective view showing a portable telephone according to the invention.

In FIG. 2, a telephone body 9 is provided with a display section 10 for displaying a telephone number dialed by a user and data stored by a built-in telephone directory function, an input key 11 for dialing a telephone number of the other person when a user makes a call, a speaker 12 for outputting a received voice, a microphone 13 for inputting a transmitting voice, a transmitting/receiving antenna 14, and a fingerprint detecting section 15 for identifying the user on which the user places his finger.

The fingerprint detecting section 15 is arranged on a side of the telephone body 9 so that the user can naturally places his finger on the fingerprint detecting section when holding the portable telephone. Also, the fingerprint detecting section 15 will be explained later in detail.

Figure 3:
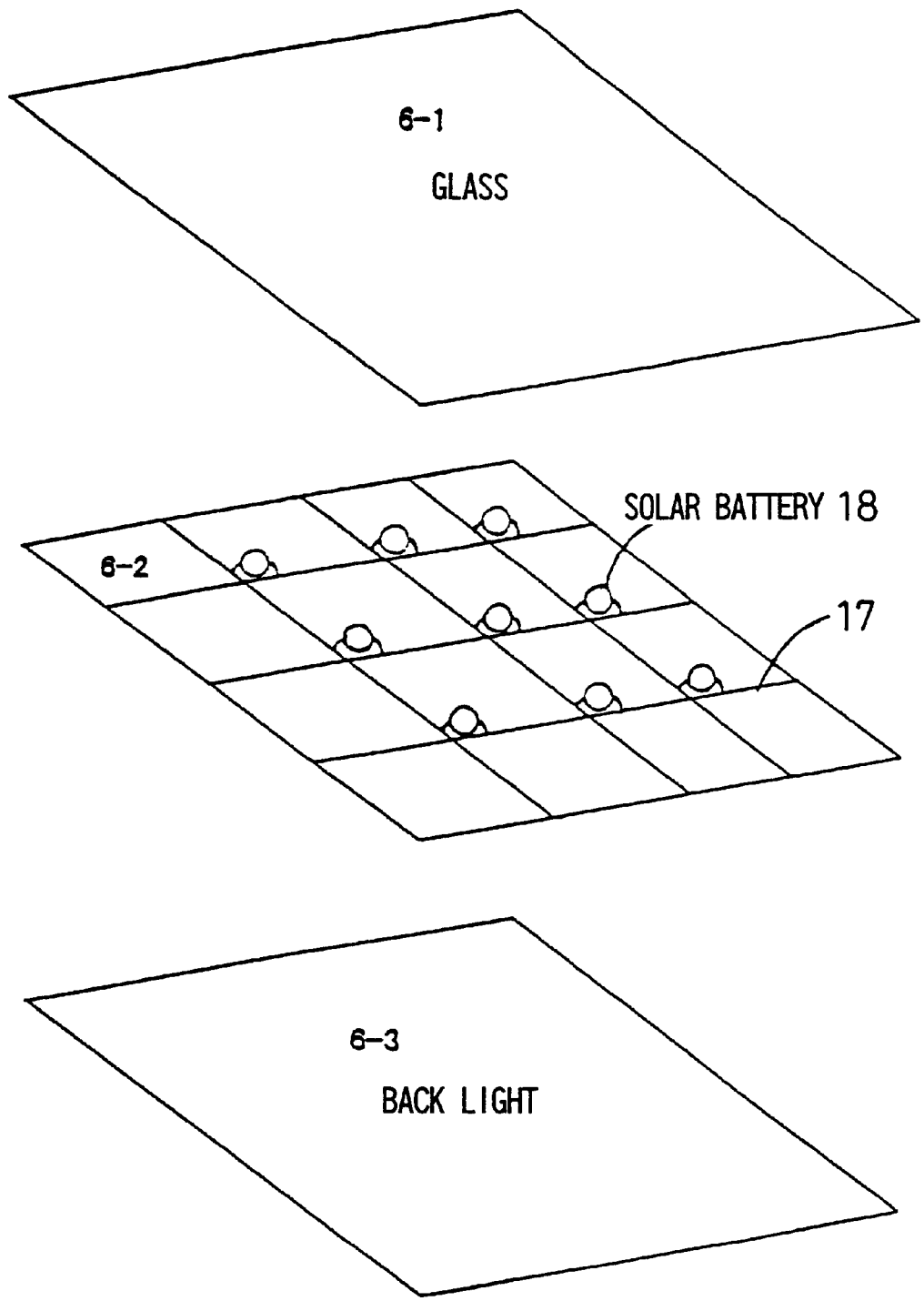
FIG. 3 is an exploded perspective view showing a fingerprint detecting section.

FIG. 3 is an exploded perspective view showing each of the fingerprint detecting section 6 of FIG. 1 and the fingerprint detecting section 15 of FIG. 2.

The fingerprint detecting section is composed of a glass portion 6-1, a sensor portion 6-2 and a back light 6-3. The sensor portion 6-2 is located on the back side of the glass portion 6-1 so that a sensor surface thereof is directed toward the glass.

The sensor portion 6-2 is constructed in a manner that a solar battery 18 is provided on each intersection of electrodes 17 made of aluminum or the like, which are arranged like a 200-bpi matrix.

The sensor portion 6-2 has a structure such that in order to pass light between the solar batteries 18, a clearance is provided, and light from the back light 6-3 located on the back side of the sensor portion is transmitted through the glass portion 6-1 located on the upper surface of the sensor portion 6-2.

[Embodiment 1]

A first embodiment of the invention will be described below with reference to FIG. 1 to FIG. 5.

In the case of using the apparatus shown in FIG. 1 or FIG. 2, the user first places his finger on the fingerprint detecting section 6 or 15. In the fingerprint detecting section 6 or 15, the sensor portion 6-2 detects a shadow made by the finger placed on the fingerprint detecting section, and then, when it is judged that a shape of the detected shadow coincides with a distribution of the shadow made by user's finger, a power is turned on.

More specifically, a portion, where the user places his finger, shields light; therefore, the solar battery 18 corresponding to the portion does not generate a power. For this reason, when the user places his finger on the fingerprint detecting section, in the fingerprint detecting section, there exist a portion of generating a power, and a portion of generating no power, and thereby, a pattern detection can be carried out.

Thereafter, a fingerprint is detected from the finger placed on the fingerprint detecting section, and then, the detected fingerprint is collated with a previously stored fingerprint data so as to identify the user.

For example, the portable information terminal equipment shown in FIG. 1 can use various data such as schedule data corresponding to the identified user. Further, the portable telephone shown in FIG. 2 can display telephone numbers from the telephone directory function corresponding to the identified user, and provide telephone numbers in accordance with the user.

Figure 4:
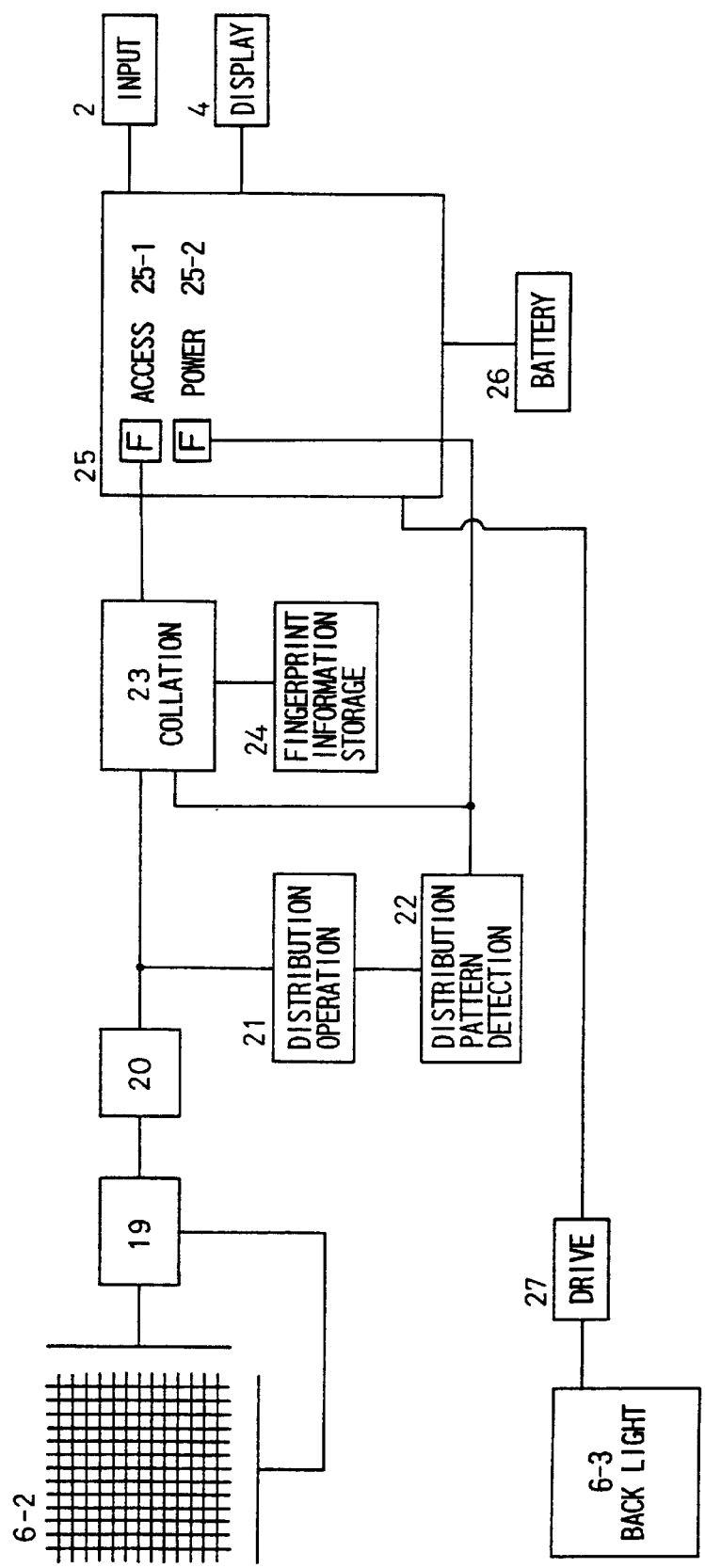
FIG. 4 is a block diagram showing an information processing apparatus according to a first embodiment of the invention.

The above-mentioned operation will be described below with reference to a block diagram shown in FIG. 4. By way of an example, an operation of the portable information terminal equipment shown in FIG. 1 will be described below.

A driving section 27 drives the back light 6-3 so that a finger placed on the glass section 6-1 is irradiated with light. Reflected light from the user's finger detected by the sensor portion 6-2 is captured in a driver 19 dot by dot, and then, is stored in the same number of storable sensor memories 20 as the solar battery 18 provided on the sensor portion 6-2. The data stored in the sensor memory 20 is outputted to a distribution operating section 21, and then, the distribution operating section 21 makes an operation to calculate what distribution the captured data has.

The distribution of captured data thus calculated is compared with a specific pattern previously stored in a distribution pattern detecting section 22. In this case, the specific pattern becomes dark at the center portion thereof when the finger is placed on the fingerprint detecting section 6. In this manner, it is possible to make a detection whether or not the finger is placed on the fingerprint detecting section 6.

In the case where the captured data coincides with the specific pattern, the distribution pattern detecting section 22 outputs a signal to a central control section 25. When receiving the signal, the central control section 25 sets a power flag 25-2 to "1" so that a power is supplied from a battery 26, and thus, turns on a power source.

Also, at this time, the distribution pattern detecting section 22 outputs a signal to a collating section 23 so as to drive the collating section 23.

When the power is turned on, the central control section 25 makes a decision whether or not a secret mode is released by the user using the input section 2. In the case where the secret mode is released, a fingerprint is detected on the basis of data of the sensor memory 20 inputted from the collating section 23, and then, the detected fingerprint is collated with a fingerprint previously stored in a fingerprint information storage section 24.

The collation is made; as a result, in the case where the detected fingerprint coincides with the previously stored fingerprint information of a fingerprint information storage section 24, the collating section 23 outputs a signal to the central control section 25, and then, an access flag 25-1 is set to "1" so that the secret mode is released.

In the explanation, fingerprint recognition has been employed for releasing the secret mode. The fingerprint recognition may be employed for limiting the use of the apparatus itself.

Figure 5:
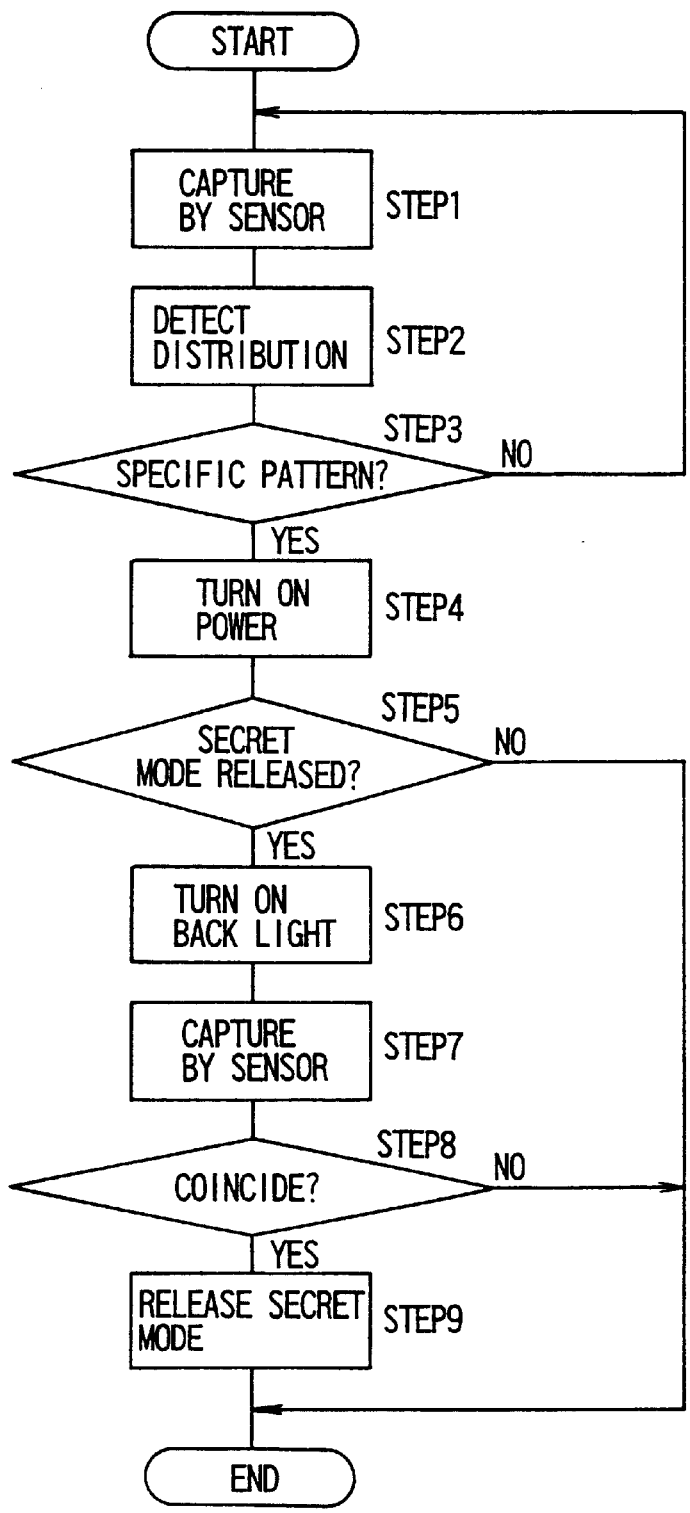
FIG. 5 is a flowchart showing processes according to the first embodiment.

This process will be described below with reference to a flowchart shown in FIG. 5.

First, in STEP 1, the reflected light is captured by the sensor portion 6-2, and in STEP 2, a distribution of light irradiated to the sensor portion 6-2 is detected on the basis of the reflected light captured in STEP 1.

In STEP 3, a decision is made whether or not the distribution of light detected in STEP 2 is the specific pattern previously stored. In this case, a distribution pattern, which becomes dark at the center portion thereof when the finger is placed on the fingerprint detecting section 6, is stored as the specific pattern.

In the case where the detected light distribution is not the specific pattern, the process is returned to STEP 1. On the other hand, in the case where the finger is placed on the fingerprint detecting section 6 or 15 and the detected light distribution coincides with the specific pattern, the power of apparatus is turned on in STEP 4.

Next, in STEP 5, a decision is made whether or not the secret mode is released by the user. In the case where the secret mode is not released, the process ends.

In the case where the secret mode is released, in STEP 6, the back light 6-3 of the fingerprint detecting section 6 or 15 is driven so that the sensor portion 6-2 is irradiated with light. In STEP 7, a fingerprint of the placed finger is captured by the sensor portion 6-2, and then, in STEP 8, a decision is made whether or not the captured fingerprint coincides with a previously stored fingerprint information.

Only when the captured fingerprint coincides with the previously stored fingerprint information, the secret mode is released in STEP 9.

As seen from the above process, by detecting a distribution of voltage by the finger placed on the fingerprint detecting section, it is possible to automatically turn on the power, and to carry out a collation of fingerprint.

[Embodiment 2]

A second embodiment of the invention will be described below with reference to FIG. 1 to FIG. 3, FIG. 6 and FIG. 7.

In the case of using the apparatus shown in FIG. 1 or FIG. 2, first, the user places his finger on the fingerprint detecting section 6 or 15. The fingerprint detecting section 6 or 15 detects a shadow made by the finger placed, and then, the back light of the fingerprint detecting section 6 or 15 is turned on.

Thereafter, a fingerprint is detected from the placed finger, and then, the detected fingerprint is collated with the previously stored fingerprint data, and thereby, the user is identified. In the case where the use's fingerprint coincides with the previously stored fingerprint data, a power is turned on. The power is kept in a state of being turned on for a period when the user places his finger on the fingerprint detecting section 6 or 15.

Figure 6:
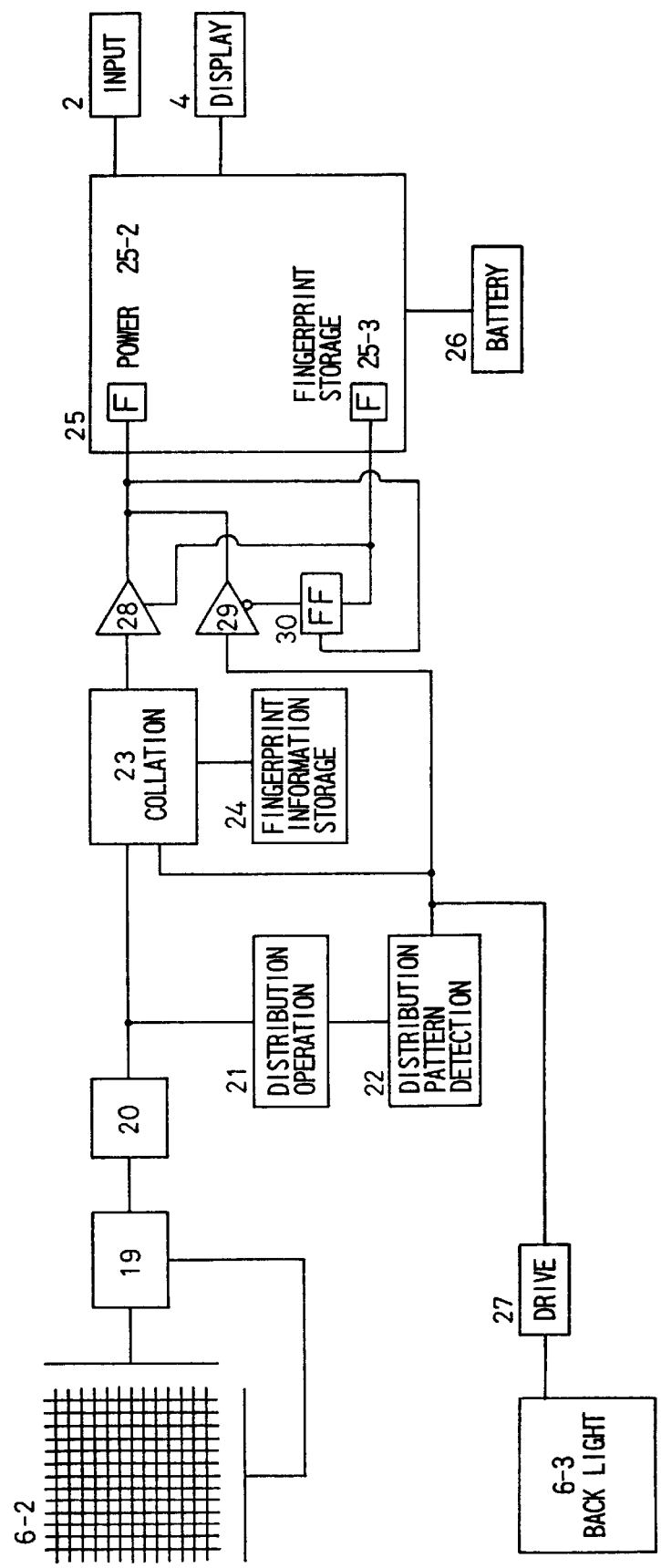
FIG. 6 is a block diagram showing an information processing apparatus according to a second embodiment of the invention.

The above-mentioned operation will be described below with reference to a block diagram shown in FIG. 6. By way of an example, an operation of the portable information terminal equipment shown in FIG. 1 will be described below.

The reflected light detected by the sensor portion 62 is captured in a driver 19 dot by dot, and then, is stored in a sensor memory 20. The data stored in the sensor memory 20 is outputted to a distribution operating section 21, and then, the distribution operating section 21 makes an operation to calculate what distribution the captured data has.

The distribution of captured data thus calculated is compared with a specific pattern previously stored in a distribution pattern detecting section 22. In this case, the specific pattern becomes dark at the center portion thereof when the finger is placed on the fingerprint detecting section 6. In this manner, it is possible to make a detection whether or not the finger is placed on the fingerprint detecting section 6.

In the case where the captured data coincides with the specific pattern, the distribution pattern detecting section 22 outputs a signal to a driving section 27, and then, the back light 6-3 is turned on by the driving section 27.

Also, at this time, the distribution pattern detecting section 22 outputs a signal to a collating section 23 so as to drive the collating section 23.

In the collating section 23, a fingerprint is detected from the data inputted in the sensor memory 20, and then, the detected fingerprint is collated with the previously stored fingerprint in the fingerprint information storage section 24. As a result of collation, in the case where the detected fingerprint coincides with the previously stored fingerprint in the fingerprint information storage section 24, the collating section 23 outputs a signal to a gate 28.

Also, in the case where the captured data coincides with a specific pattern, the distribution pattern detecting section 22 outputs a signal to a gate 29.

A fingerprint storage flag 25-3 of the central control section 25 indicates whether or not a fingerprint information is stored in the fingerprint information storage section 24. In the case where the fingerprint storage flag 25-3 is "1", a fingerprint information is stored in the fingerprint information storage section 24.

The information of the fingerprint storage flag 25-3 is inverted and outputted to the gate 29 via a flip-flop 30. When the fingerprint information is stored in the fingerprint information storage section 24, that is, when the fingerprint storage flag 25-3 is "1", the gate 29 is not opened. When the fingerprint information is not stored in the fingerprint information storage section 24, the fingerprint storage flag 25-3 is "0", which is inverted and outputted to the gate 29, and then, the gate 29 is opened. The gate 29 is opened, and thereby, the distribution pattern detecting section 22 outputs a signal "1" to the power flag 25-2 of the central control section 25, and thus, the power is turned on.

Further, the signal is also outputted from the fingerprint storage flag 25-3 to the gate 28, and only when the fingerprint storage flag 25-3 is "1", the gate 28 is opened. The gate 28 is opened, and thereby, the collating section 23 outputs a signal to the power flag 25-2 of the central control section 25, and thus, the power is turned on.

When the power is turned on, an output signal from the gate 28 is outputted to the flip-flop 30, and then, the flip-flop 30 is set. When the flip-flop 30 is set, the flip-flop 30 outputs a signal "0", and thereby, the signal "0" is outputted from the flip-flop 30. Therefore, the gate 29 is opened, and in accordance with a pattern detection of the distribution pattern detecting section 22, that is, the detection of distribution pattern after recognized the fingerprint, a signal "1" is inputted to the power flag 25-2 of the central control section 25, so that the power can be kept in an on-state.

Figure 7:
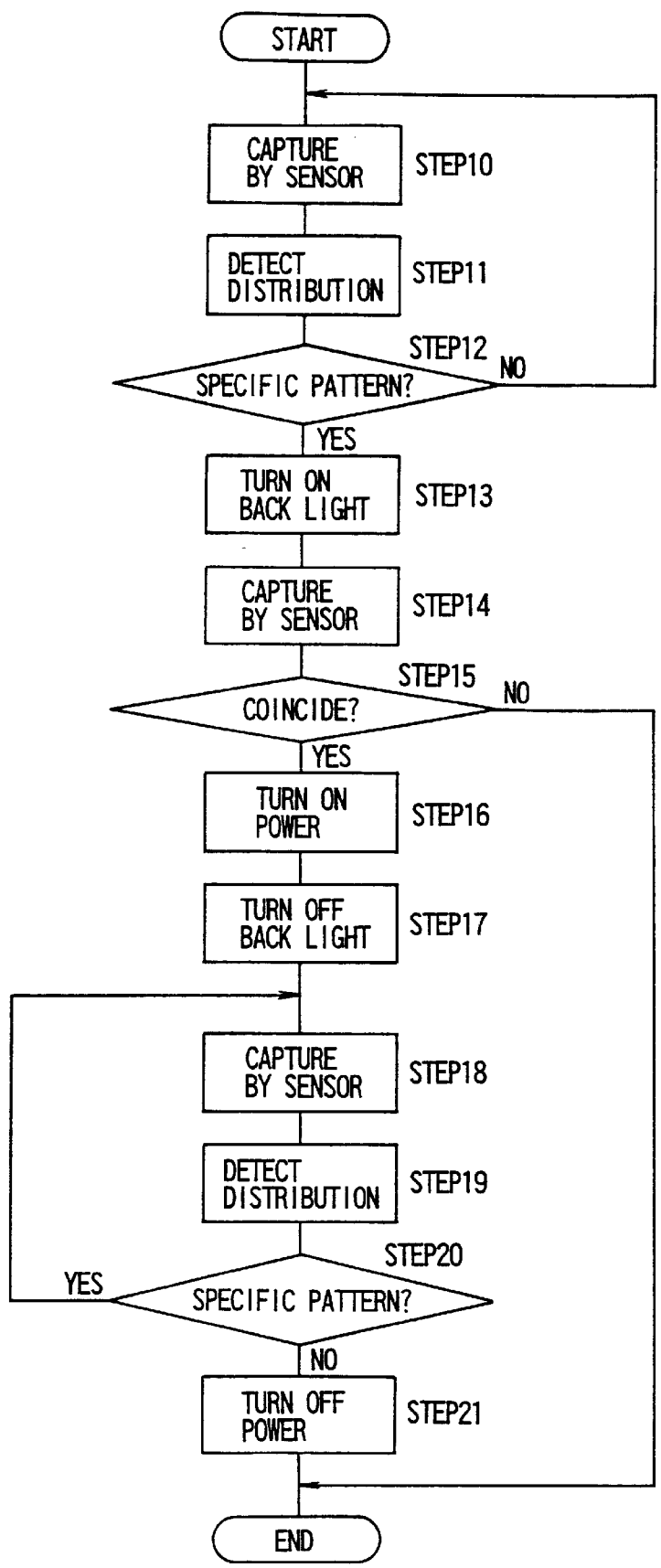
FIG. 7 is a flowchart showing processes according to the second embodiment.

This process will be described below with reference to a flowchart of FIG. 7.

First, in STEP 10, the reflected light is captured by the sensor portion 6-2, and in STEP 11, a distribution of light irradiated to the sensor portion 6-2 is detected on the basis of the reflection of light captured in STEP 10.

In STEP 12, a decision is made whether or not the distribution of light detected in STEP 11 is the specific pattern previously stored. In this case, a distribution pattern, which becomes dark at the center portion thereof when the finger is placed on the fingerprint detecting section 6, is stored as the specific pattern.

In the case where the detected light distribution is not the specific pattern, the process is returned to STEP 10. On the other hand, in the case where the finger is placed on the fingerprint detecting section 6 or 15 and the detected light distribution coincides with the specific pattern, in STEP 13, the back light 6-3 of the fingerprint detecting section 6 or 15 is turned on so that the sensor portion 6-2 is irradiated with light.

Next, in STEP 14, a fingerprint of the placed finger is captured by the sensor portion 6-2, and then, in STEP 15, a decision is made whether or not the captured fingerprint coincides with the previously stored fingerprint information.

In the case where the captured fingerprint does not coincide with the previously stored fingerprint information, the process ends. In the case where the captured fingerprint coincides with the previously stored fingerprint information, the power is turned on in STEP 16.

In STEP 17, the back light 6-3 of the fingerprint detecting section 6 or 15 is turned off. In the next STEP 18, the reflected light is again captured by the sensor portion 6-2, and then, in STEP 19, a distribution of light with which the sensor portion 6-2 is irradiated is detected on the basis of the reflected light captured in STEP 18.

In STEP 20, a decision is made whether or not the light distribution detected in STEP 19 is a previously stored specific pattern. In the case where the captured distribution coincides with the specific pattern, the process is returned to STEP 18, and then, the processes from STEP 18 to STEP 20 are repeated until user's finger is separated from the fingerprint detecting section 6 or 15.

In the captured distribution does not coincide with the specific pattern, the power is turned off in STEP 21.

Moreover, after the coincidence of fingerprint is detected, the power is turned on, and then, the back light is turned off. Thereafter, the power may be kept in an on-state until the user turns off the power.

According to the aforesaid processes, a distribution of voltage by the finger placed on the fingerprint detecting section is detected, and thereby, the back light is turned on so that fingerprint collation is carried out. In the case where the collation result is coincident, the power is automatically turned on, and then, is kept in an on-state for a period of the time the finger is placed on the fingerprint detecting section.

[Embodiment 3]

A third embodiment of the invention will be described below with reference to FIG. 1 to FIG. 3 and FIG. 8 to FIG. 10.

In the case of using the apparatus shown in FIG. 1 or FIG. 2, first, the user places his finger on the fingerprint detecting section 6 or 15. The fingerprint detecting section 6 or 15 detects a shadow made by the finger placed, and then, the back light of the fingerprint detecting section 6 or 15 is turned on.

Thereafter, a fingerprint is detected from the placed finger, and then, the detected fingerprint is collated with the previously stored fingerprint data, and thereby, the user is identified. In the case where the use's fingerprint coincides with the previously stored fingerprint data, a power is turned on.

Figure 8:
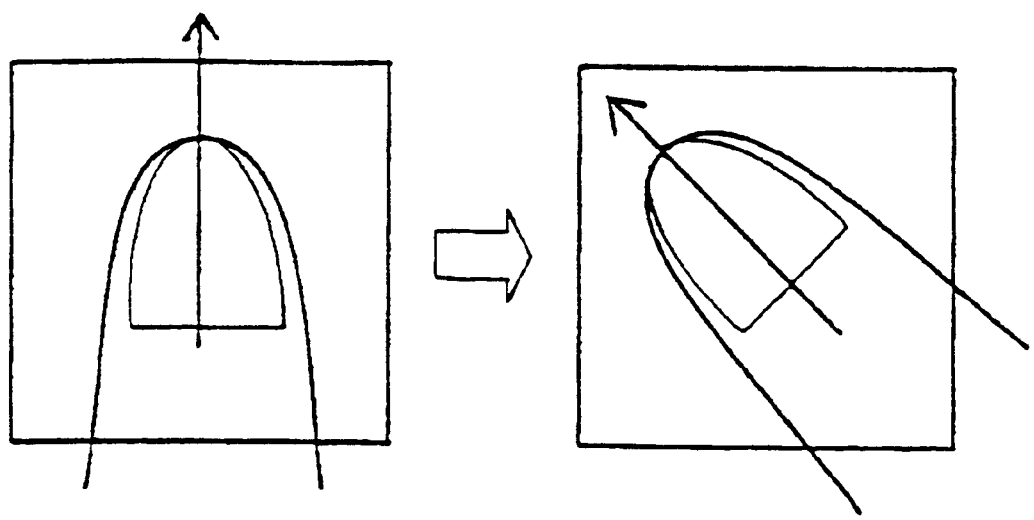
FIG. 8 is a view showing an operation in a finger angle detection.

In the case of keeping the power in an on-state, as shown in FIG. 8, the finger placed on the fingerprint detecting section 6 or 15 is rotated by a specific angle like a manner of rotating a key. The rotation of finger is detected, and thereby, the power is kept in an on-state.

Figure 9:
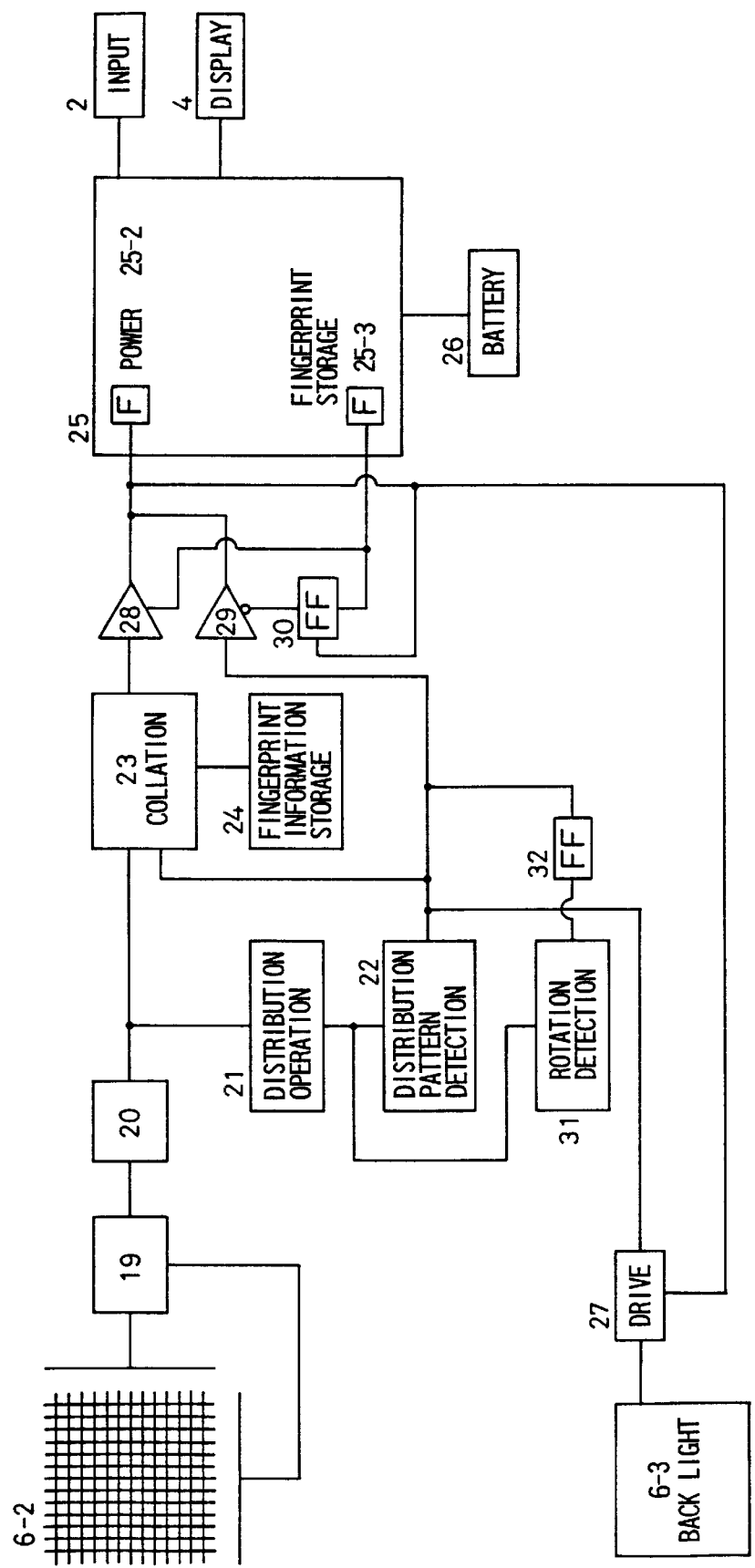
FIG. 9 is a block diagram showing an information processing apparatus according to a third embodiment of the invention.

The above-mentioned operation will be described below with reference to a block diagram shown in FIG. 9. By way of an example, an operation of the portable information terminal equipment shown in FIG. 1 will be described below.

The reflected light detected by the sensor portion 6-2 is captured in a driver 19 dot by dot, and then, is stored in a sensor memory 20. The data stored in the sensor memory 20 is outputted to a distribution operating section 21, and then, the distribution operating section 21 makes an operation to calculate what distribution the captured data has.

The distribution of captured data thus calculated is compared with a specific pattern previously stored in a distribution pattern detecting section 22. In this case, the specific pattern becomes dark at the center portion thereof when the finger is placed on the fingerprint detecting section 6. In this manner, it is possible to make a detection whether or not the finger is placed on the fingerprint detecting section 6.

In the case where the captured data coincides with the specific pattern, the distribution pattern detecting section 22 outputs a signal to a driving section 27, and then, the back light 6-3 is turned on by the driving section 27.

Also, at this time, the distribution pattern detecting section 22 outputs a signal to a collating section 23 so as to drive the collating section 23.

In the collating section 23, a fingerprint is detected from the data inputted in the sensor memory 20, and then, the detected fingerprint is collated with the previously stored fingerprint in the fingerprint information storage section 24.

As a result of collation, in the case where the detected fingerprint coincides with the previously stored fingerprint in the fingerprint information storage section 24, the collating section 23 outputs a signal to a gate 28.

Also, in the case where the captured data coincides with a specific pattern, the distribution pattern detecting section 22 outputs a signal to a gate 29.

A fingerprint storage flag 25-3 of the central control section 25 indicates whether or not a fingerprint information is stored in the fingerprint information storage section 24. In the case where the fingerprint storage flag 25-3 is "1", a fingerprint information is stored in the fingerprint information storage section 24. The information of the fingerprint storage flag 25-3 is inverted and outputted to the gate 29 via a flip-flop 30. When the fingerprint information is stored in the fingerprint information storage section 24, that is, when the fingerprint storage flag 25-3 is "1" the gate 29 is not opened.

When the fingerprint information is not stored in the fingerprint information storage section 24, the fingerprint storage flag 25-3 is "0", which is inverted and outputted to the gate 29, and then, the gate 29 is opened. The gate 29 is opened, and thereby, the distribution pattern detecting section 22 outputs a signal "1" to the power flag 25-2 of the central control section 25, and thus, the power is turned on.

Further, the signal is also outputted from the fingerprint storage flag 25-3 to the gate 28, and only when the output of the fingerprint storage flag 25-3 is "1", the gate 28 is opened. The gate 28 is opened, and thereby, the collating section 23 outputs a signal to the power flag 25-2 of the central control section 25, and thus, the power is turned on.

The distribution of the captured data calculated in the distribution operating section 21 is also outputted to a rotation detecting section 31. This rotation detecting section 31 detects a rotation of specific angle of the finger placed on the fingerprint detecting section 6.

When a detection is made such that the finger placed on the fingerprint detecting section 6 is rotated by the specific angle, a flip-flop 32 is set. The flip-flop 32 outputs a signal "1" to the power flag 25-2 of the central control section 25 via the gate 29, and then, the power is turned on.

When the flip-flop 32 is once set, the flip-flop 32 keeps the set state until the power is turned off. Therefore, the apparatus can be kept in a state of power-on even if the finger is separated from the fingerprint detecting section 6.

Figure 10:
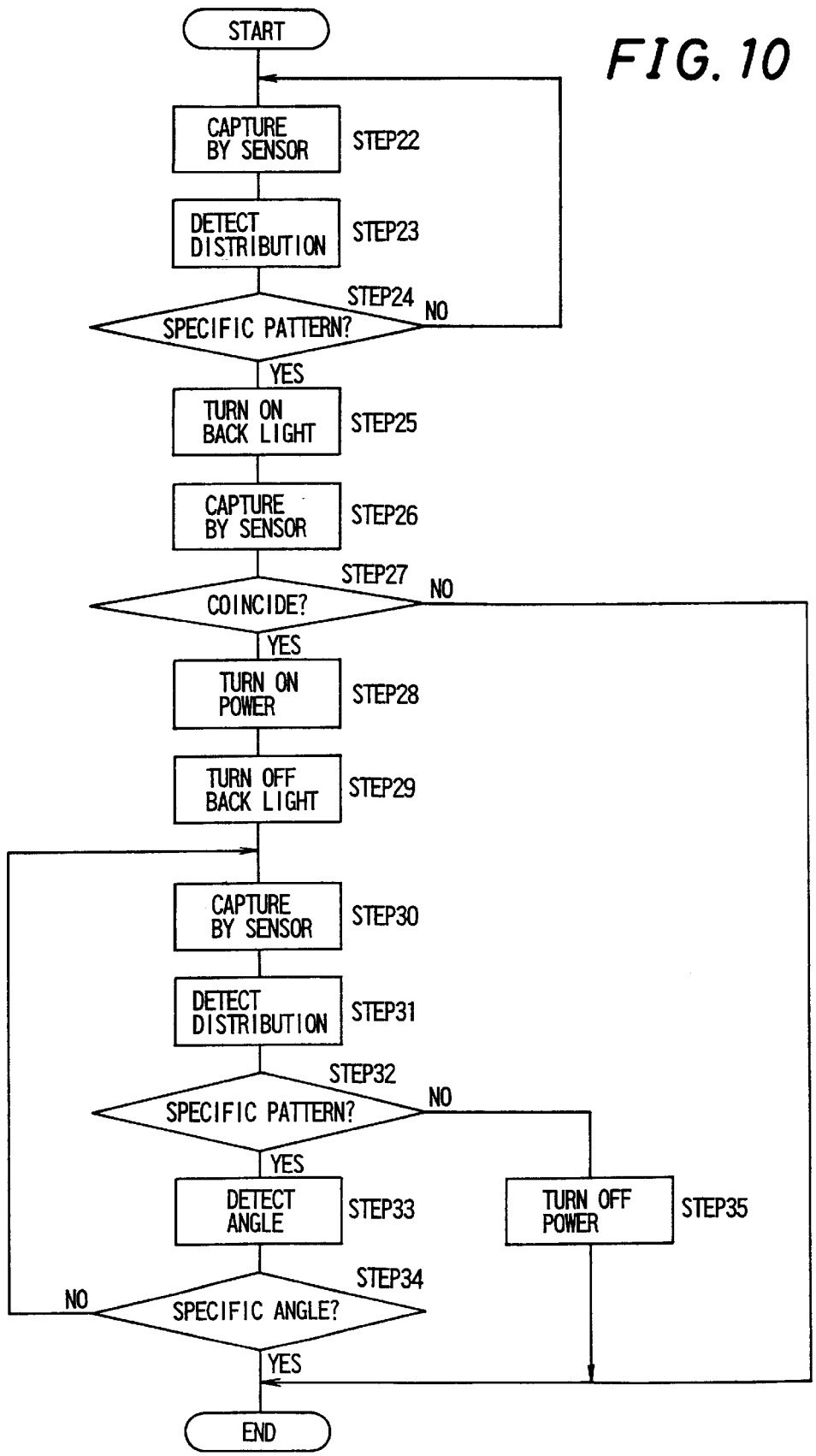
FIG. 10 is a flowchart showing processes according to the third embodiment.

This process will be described below with reference to a flowchart of FIG. 10.

First, in STEP 22, the reflected light is captured by the sensor portion 6-2, and in STEP 23, a distribution of light irradiated to the sensor portion 6-2 is detected on the basis of the reflected light captured in STEP 22.

In STEP 24, a decision is made whether or not the distribution of light detected in STEP 23 is the specific pattern previously stored. In this case, a distribution pattern, which becomes dark at the center portion thereof when the finger is placed on the fingerprint detecting section 6, is stored as the specific pattern.

In the case where the detected light distribution is not the specific pattern, the process is returned to STEP 22. On the other hand, in the case where the finger is placed on the fingerprint detecting section 6 or 15 and the detected light distribution coincides with the specific pattern, in STEP 25, the back light 6-3 of the fingerprint detecting section 6 or 15 is turned on so that the sensor portion 6-2 is irradiated with light.

Next, in STEP 26, a fingerprint of the placed finger is captured by the sensor portion 6-2, and then, in STEP 27, a decision is made whether or not the captured fingerprint coincides with the previously stored fingerprint information.

In the case where the captured fingerprint does not coincide with the previously stored fingerprint information, the process ends.

In the case where the captured fingerprint coincides with the previously stored fingerprint information, the power is turned on in STEP 28.

In STEP 29, the back light 6-3 of the fingerprint detecting section 6 or 15 is turned off. In the next STEP 30, the reflected light is again captured by the sensor portion 6-2, and then, in STEP 31, a distribution of light irradiated to the sensor portion 6-2 is detected on the basis of the reflection of light captured in STEP 30.

In STEP 32, a decision is made whether or not the distribution of light detected in STEP 31 is a previously stored specific pattern.

In the case where the captured distribution coincides with the specific pattern, in STEP 33, a change is detected in an angle of the finger placed on the fingerprint detecting section 6 or 15.

In STEP 34, a decision is made whether or not the angle detected in STEP 33 is a specific angle. In the case where the detected angle is not a specific angle, the processes from STEP 30 to STEP 34 are repeated until a change of the specific angle in the finger position is obtained, or the finger is separated from the fingerprint detecting section 6 or 15.

Further, in the case where the captured distribution does not coincide with the specific pattern as a result of the decision in STEP 32, the power is turned off in STEP 35, and then, the process ends.

According to the aforesaid processes, a distribution of voltage by the finger placed on the fingerprint detecting section is detected, and thereby, the back light is turned on so that fingerprint collation is carried out. In the case where the collation result is coincident, the power is automatically turned on, and then, by detecting a rotation of specific angle of the finger placed on the fingerprint detecting section, the power is kept in an on-state.

[Embodiment 4]

A fourth embodiment of the invention will be described below with reference to FIG. 1 to FIG. 3 and FIG. 11 and FIG. 12.

In the case of using the apparatus shown in FIG. 1 or FIG. 2, first, the user places his finger on the fingerprint detecting section 6 or 15. The fingerprint detecting section 6 or 15 detects a shadow made by the finger placed, and then, the back light of the fingerprint detecting section 6 or 15 is turned on.

Thereafter, a fingerprint is detected from the placed finger, and then, the detected fingerprint is collated with the previously stored fingerprint data, and thereby, the user is identified.

When the user rotates his placed finger by a specific angle, the power is turned on only in the case where the user's fingerprint coincides with the previously stored fingerprint data.

In the case where the fingerprint of the finger placed on the fingerprint detecting section coincides with a previously stored fingerprint data, the back light 6-3 is turned off, or is weakened.

Figure 11:
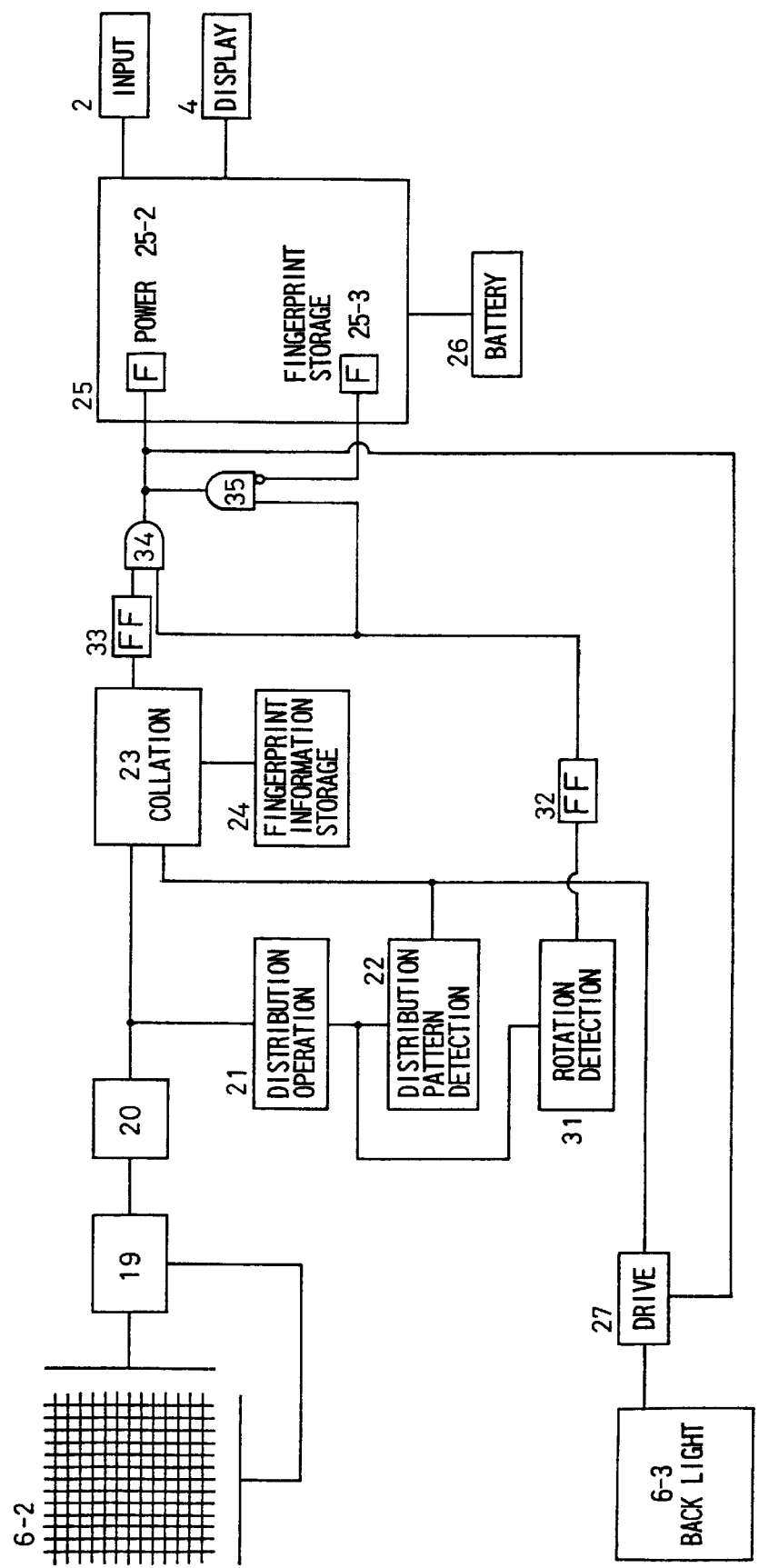
FIG. 11 is a block diagram showing an information processing apparatus according to a fourth embodiment of the invention.

The above-mentioned operation will be described below with reference to a block diagram shown in FIG. 11. By way of an example, an operation of the portable information terminal equipment shown in FIG. 1 will be described below.

The reflected light detected by the sensor portion 62 is captured in a driver 19 dot by dot, and then, is stored in a sensor memory 20. The data stored in the sensor memory 20 is outputted to a distribution operating section 21, and then, the distribution operating section 21 makes an operation to calculate what distribution the captured data has.

The distribution of captured data thus calculated is compared with a specific pattern previously stored in a distribution pattern detecting section 22. In this case, the specific pattern becomes dark at the center portion thereof when the finger is placed on the fingerprint detecting section 6. In this manner, it is possible to make a detection whether or not the finger is placed on the fingerprint detecting section 6.

In the case where the captured data coincides with the specific pattern, the distribution pattern detecting section 22 outputs a signal to a driving section 27, and then, the back light 6-3 is turned on by the driving section 27.

Also, at this time, the distribution pattern detecting section 22 outputs a signal to a collating section 23 so as to drive the collating section 23.

In the collating section 23, a fingerprint is detected on the basis of the inputted data of the sensor memory 20, and then, the detected fingerprint is collated with a previously stored fingerprint in the fingerprint information storage section 24. As a result of collation, in the case where the detected fingerprint coincides with the previously stored fingerprint in the fingerprint information storage section 24, the collating section 23 outputs a signal "1" to an AND circuit 34 via a flip-flop 33.

The fingerprint storage flag 25-3 of the central control section 25 indicates whether or not a fingerprint information is stored in the fingerprint information storage section 24. In the case where the fingerprint storage flag 25-3 is "1", a fingerprint information is stored in the fingerprint information storage section 24. The information of the fingerprint storage flag 25-3 is inverted and outputted to the AND circuit 35.

The distribution of the captured data calculated in the distribution operating section 21 is also outputted to a rotation detecting section 31. This rotation detecting section 31 detects a rotation of specific angle of the finger placed on the fingerprint detecting section 6.

When making a detection that the finger placed on the fingerprint detecting section 6 is rotated by the specific angle, a flip-flop 32 is set. When the flip-flop 32 is set, the flip-flop 32 outputs a signal "1" to AND circuits 34 and 35.

In the case where fingerprint information is not stored in the fingerprint information storage section 24, a signal "0" from the fingerprint storage flag 25-3 is inverted and outputted. Thus, when the finger placed on the fingerprint detecting section 6 is rotated by the specific angle, the AND circuit 35 outputs a signal "1" to the power flag 25-2 so that the power is turned on.

Further, in the case where the fingerprint detected in the collating section 23 coincides with the fingerprint previously stored in the fingerprint information storage section 24 and the finger placed on the fingerprint detecting section 6 is rotated by the specific angle, the AND circuit 34 outputs a signal "1" to the power flag 25-2 so that the power is turned on.

When the flip-flop 32 is once set, the flip-flop 32 keeps the set state until the power is turned off. Therefore, the apparatus can be kept in a state of power-on even if the finger is separated from the fingerprint detecting section 6.

When the power flag 25-2 of the central control section 25 becomes "1" and the power is turned on, the power flag 25-2 outputs a signal to the driving section 27, and then, the back light 6-3 is turned off, or is weakened by the driving section 27.

Figure 12:
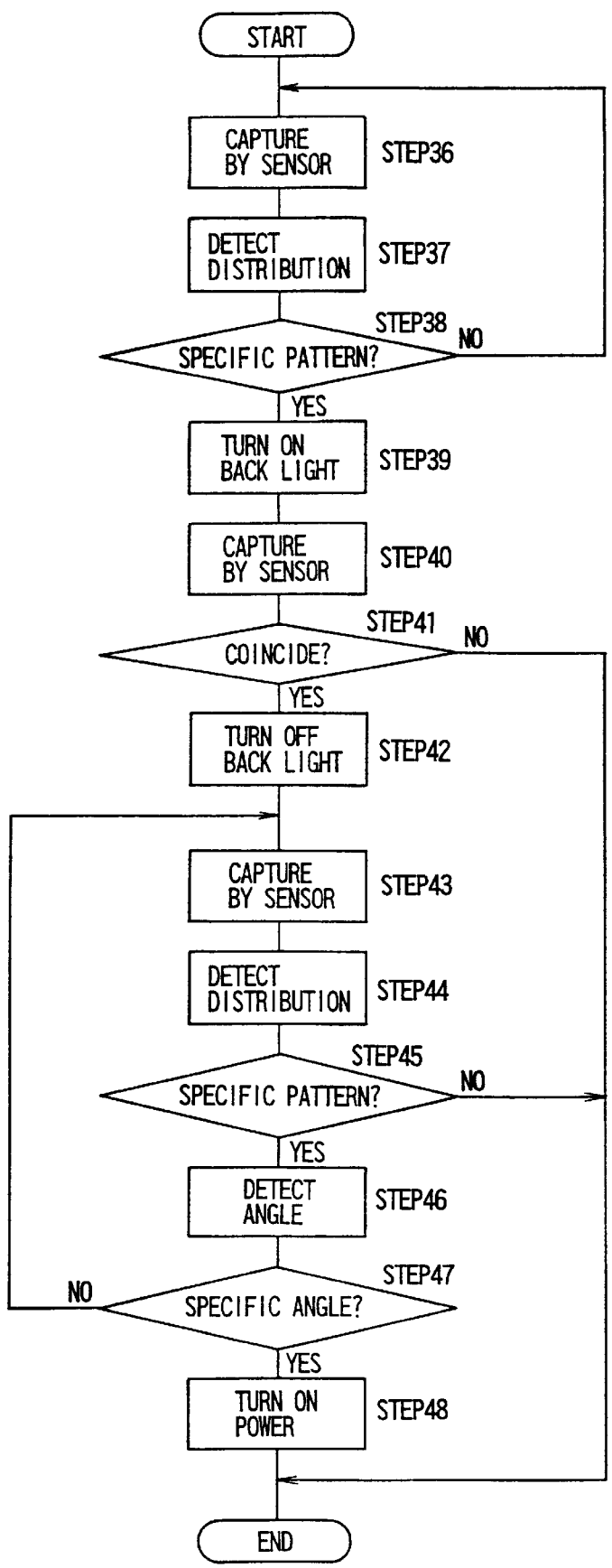
FIG. 12 is a flowchart showing processes according to the fourth embodiment.

This process will be described below with reference to a flowchart of FIG. 12.

First, in STEP 36, the reflected light is captured by the sensor portion 6-2, and in STEP 37, a distribution of light irradiated to the sensor portion 6-2 is detected on the basis of the reflected light captured in STEP 36.

In STEP 38, a decision is made whether or not the distribution of light detected in STEP 37 is the specific pattern previously stored. In this case, a distribution pattern, which becomes dark at the center portion thereof when the finger is placed on the fingerprint detecting section 6, is stored as the specific pattern.

In the case where the detected light distribution is not the specific pattern, the process is returned to STEP 36. On the other hand, in the case where the finger is placed on the fingerprint detecting section 6 or 15 and the detected light distribution coincides with the specific pattern, in STEP 39, the back light 6-3 of the fingerprint detecting section 6 or 15 is turned on so that the sensor portion 6-2 is irradiated with light.

Next, in STEP 40, a fingerprint of the placed finger is captured by the sensor portion 6-2, and then, in STEP 41, a decision is made whether or not the captured fingerprint coincides with the previously stored fingerprint information.

In the case where the captured fingerprint does not coincide with the previously stored fingerprint information, the process ends.

In the case where the captured fingerprint coincides with the previously stored fingerprint information, in STEP 42, the back light 6-3 of the fingerprint detecting section 6 or 15 is turned off.

In the next STEP 43, the reflected light is again captured by the sensor portion 6-2, and then, in STEP 44, a distribution of light irradiated to the sensor portion 6-2 is detected on the basis of the reflected light captured in STEP 43.

In STEP 45, a decision is made whether or not the distribution of light detected in STEP 44 is a previously stored specific pattern.

In the case where the captured distribution does not coincide with the specific pattern, the process ends.

In the case where the captured distribution coincides with the specific pattern, in STEP 46, a change is detected in an angle of the finger placed on the fingerprint detecting section 6 or 15.

In STEP 47, a decision is made whether or not the angle detected in STEP 46 is a specific angle. In the case where the detected angle is not a specific angle, the processes from STEP 43 to STEP 47 are repeated until a change of the specific angle in the finger position is obtained, or the finger is separated from the fingerprint detecting section 6 or 15.

Further, in the case where the angle detected in STEP 46 is the specific angle as a result of the decision in STEP 47, the power is turned on in STEP 48.

According to the aforesaid processes, a distribution of voltage by the finger placed on the fingerprint detecting section is detected, and thereby, the back light is turned on so that fingerprint collation is carried out. In the case where the collation result is coincident and the finger placed on the fingerprint detecting section is rotated by the specific angle, the power is automatically turned on. After detecting the fingerprint, the back light is turned off, or is weakened.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processing apparatus comprising:

a finger contact plate for making a finger contact;

a light source for irradiating light to a contacting finger via the finger contact plate;

a fingerprint detecting section for detecting a fingerprint on the basis of reflected light of the light source;

a fingerprint collating section for collating the fingerprint detected by the fingerprint detecting section with a previously stored fingerprint;

a contact detecting section for detecting a contact of the finger onto the finger contact plate by detecting a finger shadow using exterior light;

a sensor having an electromotive force function and operating without an exterior power source;

a light source driving section for driving the light source when a contact of the finger is detected by the contact detecting section;

a control section for putting the apparatus in a usable state when a coincident collation result is obtained by the fingerprint collating section;

wherein the control section continuously puts the apparatus into a usable state when a movement of the finger in contact with the finger contact plate is detected by the contact detecting section, wherein the finger has a first linear directional orientation with regard to the finger contact plate; and wherein the control section continuously puts the apparatus into the usable state when the linear directional orientation of the finger is rotated at an angle from the first linear directional orientation even when the finger does not contact the finger contact plate.

* * * * *